US006026993A

United States Patent [19]

Sperna Weiland

[11] Patent Number: 6,026,993

[45] Date of Patent: Feb. 22, 2000

[54] PUMP AND PUMP OUTLET NOZZLE

[75] Inventor: Jan Adolf Ernst Sperna Weiland, Deventer, Netherlands

[73] Assignee: Sara Lee/DE N.V., Utrecht, Netherlands

[21] Appl. No.: 09/162,987

[22] Filed: Sep. 29, 1998

[30] Foreign Application Priority Data

Sep. 30, 1997 [NL] Netherlands ............................ 1007168

[51] Int. Cl.[7] ............................ F16K 15/14; B65D 25/40; B65D 51/18

[52] U.S. Cl. ............................ 222/480; 222/490; 137/849

[58] Field of Search .................................... 222/480, 490, 222/321, 108; 137/849; 417/520

[56] References Cited

U.S. PATENT DOCUMENTS

| | | | |
|---|---|---|---|
| 1,559,606 | 11/1925 | Gray | 417/520 |
| 3,245,428 | 4/1966 | Klimak et al. | 137/849 |
| 3,248,022 | 4/1966 | Schulman et al. | 222/321 |
| 4,133,457 | 1/1979 | Klassen | 137/849 |
| 4,728,009 | 3/1988 | Schmidt | 222/321 |
| 5,186,368 | 2/1993 | Garcia | 222/490 |
| 5,429,275 | 7/1995 | Katz | 222/108 |
| 5,803,121 | 9/1998 | Estes | 137/849 |

FOREIGN PATENT DOCUMENTS

| | | |
|---|---|---|
| 0 758 615 A1 | 2/1997 | European Pat. Off. . |
| 0 794 126 A2 | 9/1997 | European Pat. Off. . |
| 2 643 338 | 8/1990 | France . |
| 74 25 331 | 11/1974 | Germany . |
| 1003894 | 3/1998 | Netherlands . |
| 966137 | 8/1964 | United Kingdom . |

OTHER PUBLICATIONS

Copy of the Search Report for NL 1007168.

*Primary Examiner*—Andres Kashnikow
*Assistant Examiner*—Davis Hwu
*Attorney, Agent, or Firm*—Merchant & Gould, P.C.

[57] ABSTRACT

A pump comprises an inlet for pumping a liquid and an outlet nozzle for dispensing the pumped liquid. The outlet nozzle comprises an outflow opening which includes an outlet valve formed by a valve wall made of a flexible material. In a rest position, the valve wall closes the outflow opening. The valve wall comprises at least three cuts provided in the configuration of a star, each extending from a common point of the valve wall in a radial direction of the outflow opening. The pump further comprises an outlet valve energization element for pressing valve subwalls, formed between the cuts of the valve wall, from an inside of the outlet nozzle adjacent to the valve wall in a downstream direction of the outlet nozzle, whereby the valve subwalls are bent in the downstream direction and at the cuts between the valve subwalls flow passages are formed for opening the outflow opening for dispensing the pumped liquid. The valve subwalls spring back to the rest position and close the outflow opening again when the outlet valve energization element is moved back in a direction opposite to the downstream direction.

15 Claims, 8 Drawing Sheets

PUMP AND PUMP OUTLET NOZZLE

This invention relates to a pump for dispensing a liquid, comprising an inlet for pumping the liquid, an outlet nozzle, and a liquid flow path extending from the inlet to the outlet nozzle for dispensing the pumped liquid via the outlet nozzle.

This invention also relates to an outlet nozzle for use in such a pump.

Such a pump is known per se and is typically used for dispensing viscous liquids, such as coffee or lemonade extract which is to be diluted with a base liquid such as water for obtaining a beverage suitable for consumption. A disadvantage of the known apparatus is that the pump, after dispensing a desired amount of liquid, exhibits after-drip, that is, after the desired amount of liquid has been dispensed, a few drops fall from the outlet nozzle. This generally involves, in addition to a waste of liquid, spillage of liquid at a point where such is not desirable. Moreover, residual liquids are left behind in the outlet nozzle, which, when they have dried up after some time, may cause an outflow opening of the outlet nozzle to clog up.

A further disadvantage of the known apparatus is that the liquid jet formed by the outlet nozzle may have an unpredictable form and direction. This is aggravated when the outflow opening of the outlet nozzle is partly clogged up owing to the dried-up residual liquids referred to above.

The object of the invention is to provide a solution to the problems outlined. Accordingly, the invention is characterized in that the outlet nozzle comprises an outflow opening which includes an outlet valve, the outlet valve being formed by a valve wall made of a flexible material, which, in a rest position, closes the outflow opening, the valve wall comprising at least three cuts provided in the configuration of a star, each extending from a common point of the valve wall in a radial direction of the outflow opening, and the pump further comprising an outlet valve energization element for pressing valve subwalls, formed between the cuts of the valve wall, from an inside of the outlet nozzle adjacent to the valve wall in a downstream direction of the outlet nozzle, so that these valve subwalls are bent in the downstream direction and at the cuts between the valve subwalls flow passages are formed for opening the outflow opening for dispensing the pumped liquid, while the valve subwalls spring back to the rest position and close the outflow opening again when the outlet valve energization element is moved back in a direction opposite to the downstream direction.

When dispensing liquid, the outflow openings formed at the cuts between the valve subwalls form a liquid jet whose form and direction are at least substantially stable. After the pumped liquid has been dispensed, the valve subwalls return to the rest position and close off the outflow opening immediately, thereby preventing after-drip.

In particular, the pump is characterized in that the valve wall in the rest position has a round surface on the inside of the outlet nozzle adjacent to the valve wall. By virtue of this feature, the closure of the outflow opening in the rest position has been found to be optimally reliable.

Preferably, the common point is located at least substantially in the center of gravity of the valve wall.

More particularly, the valve wall is provided with four cuts. Preferably, adjacent cuts include an at least substantially right angle. In that case, the cuts in combination form a cross.

According to a preferred embodiment, the pump further comprises means for moving the outlet valve energization element in downstream direction when the pump dispenses liquid. What is thus accomplished is that the opening and closing of the outlet valve are always synchronized with the dispensing of the pumped liquid.

According to a particular embodiment, the pump is designed as a metering pump for dispensing an amount of liquid in a metered manner upon an energization of the pump. Such a pump is suitable in particular for dispensing a liquid extract, such as the above-mentioned coffee or lemonade extract. In this way, it can be accurately determined how much coffee or lemonade extract is to be dispensed for preparing a beverage suitable for consumption.

According to a further elaboration, the pump designed as a metering pump further comprises a cylinder chamber and a plunger which is accommodated in the cylinder chamber for movement between a first position and a second position, the plunger being connected to the outlet valve energization element, the liquid flow path of the pump extending from the inlet to the cylinder chamber and from the cylinder chamber to the outlet nozzle, while for dispensing the pumped liquid contained in the cylinder chamber in a metered manner, the plunger is moved in a direction from the second position to the first position; upon movement of the plunger in the direction from the second position to the first position, the outlet valve energization element causes the valve subwalls to bend from the rest position, so that the outflow opening is opened for dispensing the pumped liquid from the cylinder chamber; upon movement of the plunger in a direction from the first position to the second position, liquid is pumped via the inlet to the cylinder chamber; and upon movement of the plunger from the first position to the second position, the outlet valve energization element is moved back in the direction opposite to the downstream direction, so that the valve subwalls spring back into the rest position and close the outflow opening again. Here, the pump may further comprise setting means for setting a setting position located between the first and second position, while the plunger can be moved relative to the cylinder chamber from the second extreme position to the setting position.

The invention will presently be explained with reference to the drawings, wherein.

Figure 1:
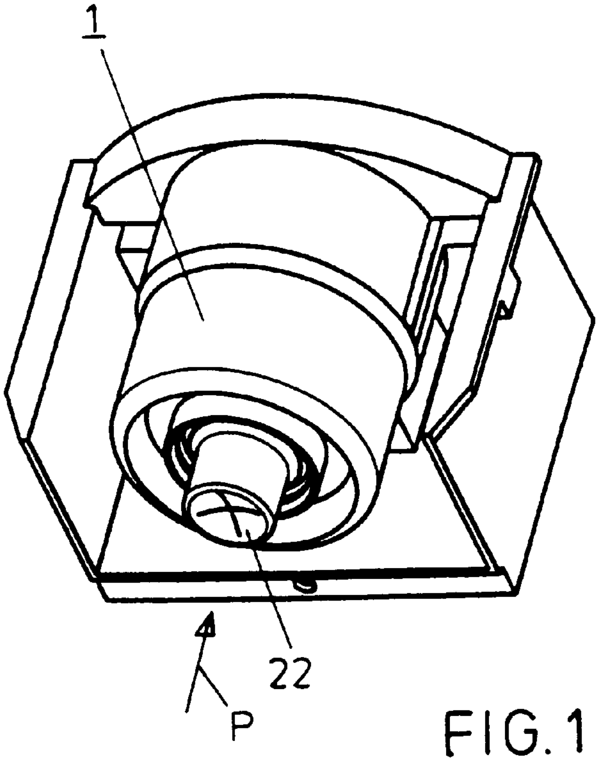
FIG. 1 is a perspective view of a possible embodiment of a pump according to the invention.

Referring to FIGS. 1–8 and FIG. 11, hereinafter a possible embodiment of a pump 1 according to the invention will be described. In this example, the pump is designed as a metering pump for dispensing an amount of liquid in a metered manner upon energization of the pump.

The pump 1 comprises a housing 2. In a front section 4 of the housing 2 a cylinder chamber 6 is provided. In the cylinder chamber 6, a plunger 8 is accommodated for reciprocation. The cylinder chamber 6 further extends into a space 9 formed in the plunger 8.

The pump further comprises an inlet 10 which is in fluid communication with the cylinder chamber 6 via a first non-return valve 14. In addition, the cylinder chamber 6 is in fluid communication with an outlet nozzle 12 via a second non-return valve 16.

Figure 3:
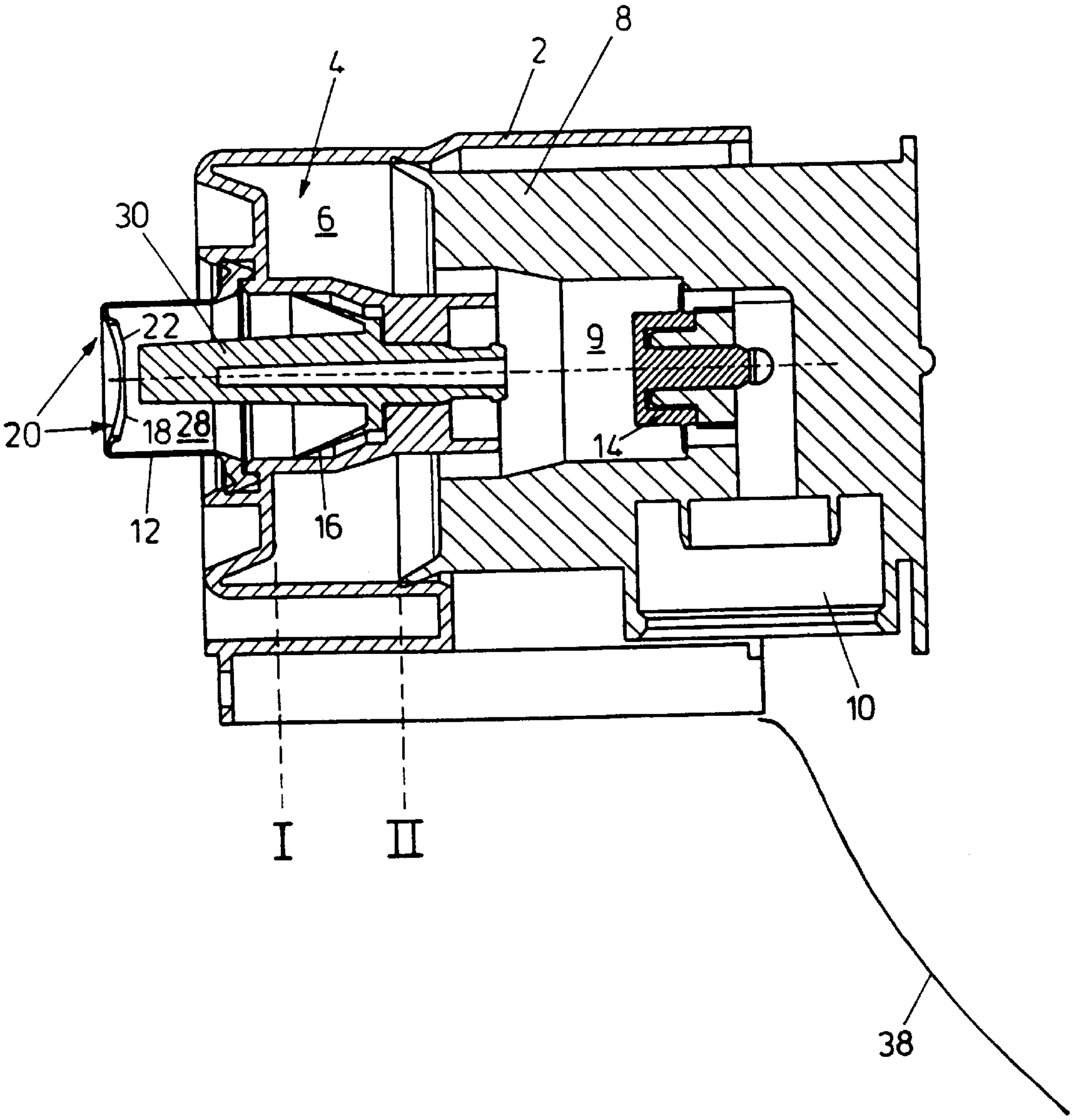
FIG. 3 is a cross section of the pump of FIG. 1, along line A—A in FIG. 2, with the pump in an initial position.

The plunger is accommodated in the cylinder chamber for movement between a first extreme position I, indicated in FIG. 3, and a second extreme position II. A liquid flow path of the pump extends from the inlet 10 via the cylinder chamber 6 to the outlet nozzle 12. The first and second non-return valve 14, 16 allow liquid to pass only in the downstream direction of the liquid flow path, that is, in the direction from the inlet 10 to the outlet nozzle 12.

Figure 2:
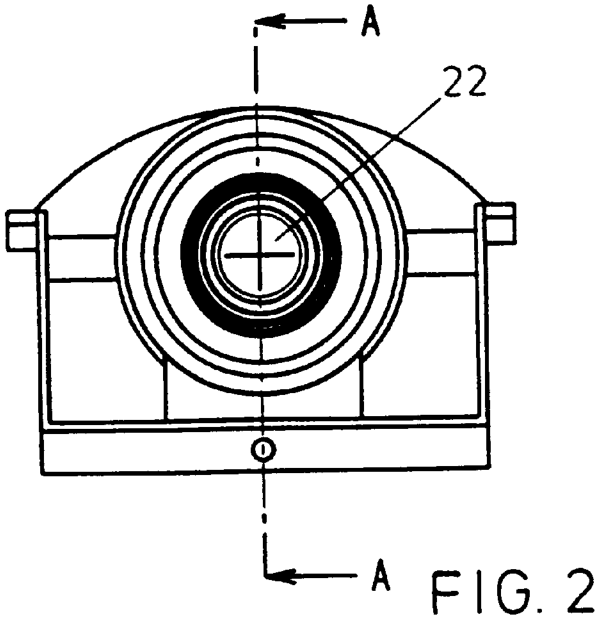
FIG. 2 is a view of the pump according to FIG. 1 in the direction of the arrow P of FIG. 1.

The outlet nozzle 12 comprises an outflow opening 20 which includes an outlet valve 18. The outlet valve 18 is formed by a valve wall 22 made of a flexible material and connected with the rest of the outlet nozzle. In a rest position as shown in FIGS. 1, 2 and 3, the valve wall closes off the outflow opening 20. In this example, the valve wall is in this rest position when the pump is in the second position referred to. The valve wall is provided with at least three, and in this example four, cuts 24 arranged in the configuration of a star (see FIG. 8), each extending from a common point 26 of the valve wall 22 in a radial direction of the outflow opening 22. In the rest position, the valve wall has a round surface on the inside 28 of the outlet nozzle, adjacent to the valve wall. (See FIG. 3).

The pump further comprises an outlet valve energization element 30 which, in this example, is connected to the plunger 8. In this example, this connection is a rigid mechanical connection. The outlet valve energization element 30 is arranged for pressing the valve subwalls 32 formed between the cuts 24 of the valve wall 22 from the inside 28 of the outlet nozzle 12, adjacent to the valve wall, in the downstream direction of the outlet nozzle, so that these valve subwalls are bent in the downstream direction and flow passages 34 (see FIG. 6) are formed at the cuts between the valve subwalls, for opening the outflow opening for dispensing liquid.

The valve subwalls have the property of springing back to the rest position, as shown in FIG. 3, when the outlet valve energization element is moved back in a direction opposite to the downstream direction. In this rest position, the valve subwalls 32 will close off the outflow opening again.

In the rest position as shown in FIG. 3, the edges 36 of the valve subwalls 36 adjacent to the cuts are disposed against each other and thereby close off the outflow opening properly. Adjacent cuts include an at least substantially perpendicular angle ϕ.

Figure 4:
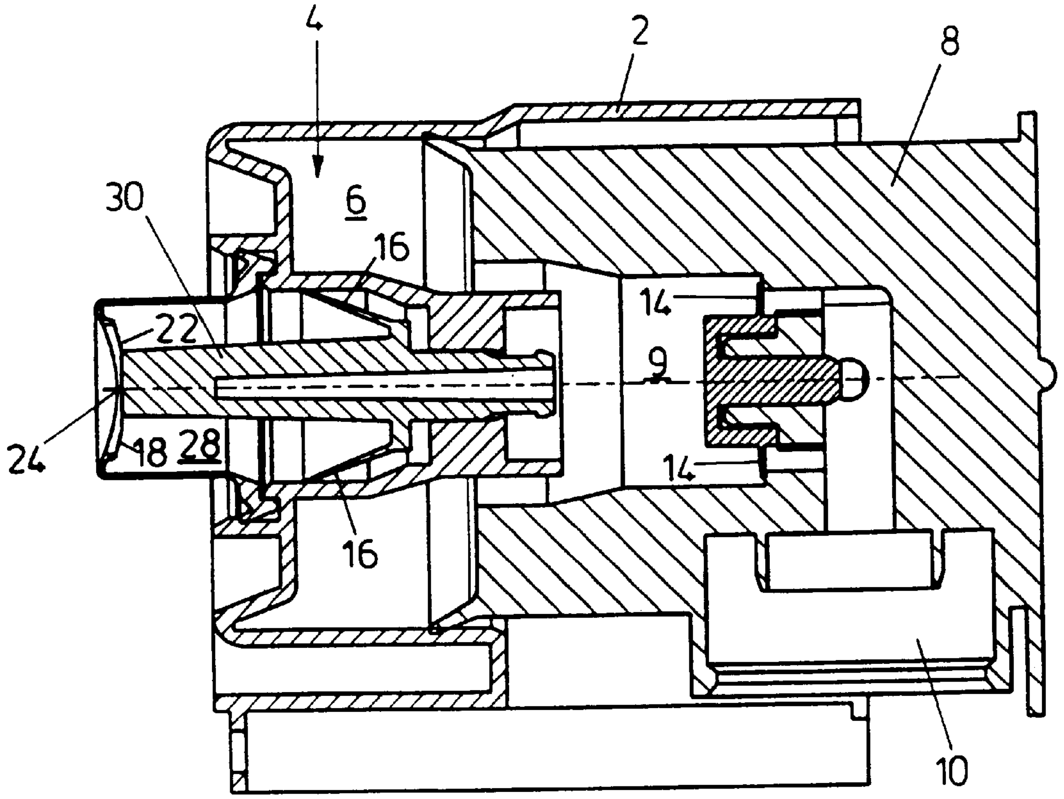
FIG. 4 is a cross section of the pump of FIG. 1, along line A—A in FIG. 2, where a plunger of the pump has just started moving for dispensing liquid.

The operation of the apparatus is as follows. The starting-point is that the plunger is in the second extreme position and that the valve subwalls are in the rest position, as shown in FIG. 3. The cylinder chamber 6 is filled completely with a viscous liquid. In this example, the inlet 10 of the pump is connected with a reservoir 38, schematically shown in FIG. 3, which is filled entirely with a viscous liquid such as a coffee extract or a lemonade extract. The plunger is now moved in the direction from the second position to the first position. This situation is shown in FIG. 4. It further appears from FIG. 4 that the plunger forms means for moving the outlet valve energization element in downstream direction when the pump is energized for dispensing the liquid. As the plunger is moved in the direction from the second to the first position, the volume of the cylinder chamber 6 will decrease. As a consequence, the liquid contained in the cylinder chamber 6 is forced via the second non-return valve 16 into the outlet nozzle 12, while the first non-return valve 14 remains closed and prevents liquid flowing from the cylinder chamber 6 to the inlet 10.

Figure 5:
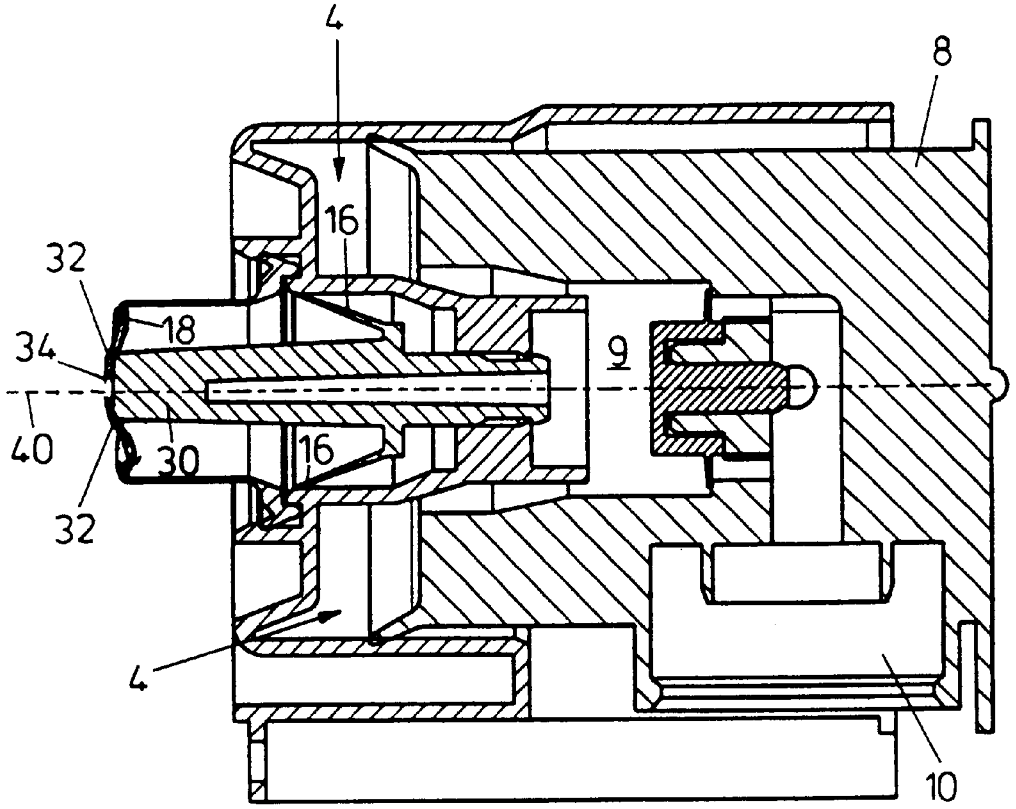
FIG. 5 is a cross section of the pump of FIG. 1, along line A—A in FIG. 2, where the plunger has been moved further with respect to FIG. 4.
Figure 6:
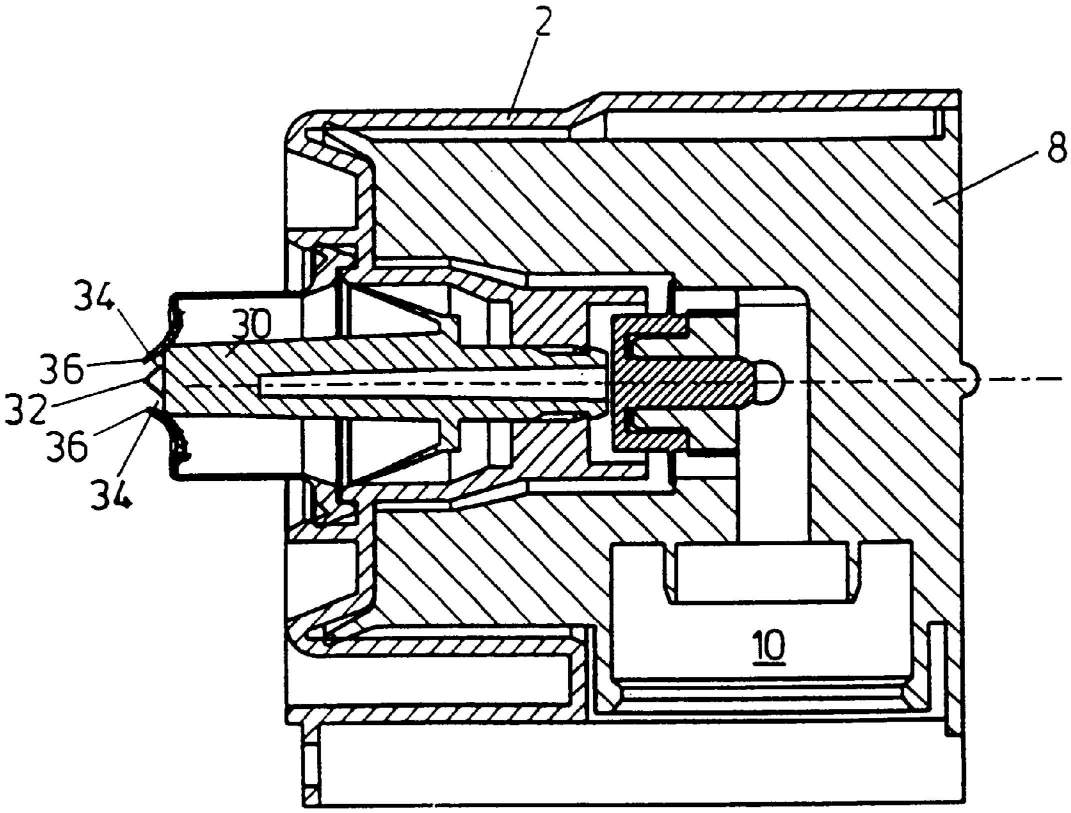
FIG. 6 is a cross section of the pump of FIG. 1, along line A—A in FIG. 2, where the plunger has been moved into an extreme position and the liquid has been dispensed.

The outlet valve energization element will start to push from the inside 28 against the round side of the valve wall 22. This is also shown in FIG. 4. Upon further movement of the plunger in the direction of the first position, the outlet valve energization element 30 will bend the valve subwalls 32 in the downstream direction, so that flow passages 34 are formed at the cuts 24 between the valve subwalls 32, for opening the outflow opening 20. This situation is shown in FIG. 5. Simultaneously, the plunger 8 will force liquid from the cylinder chamber 6 to the outlet nozzle 12. This liquid then leaves the outlet nozzle 12 via the flow passages 34. These flow passages 34 ensure that the form and the direction of the jet is constant and predetermined. Upon further movement of the plunger, the cylinder chamber 6 is thus at least substantially emptied. This situation is shown in FIG. 6.

Figure 7:
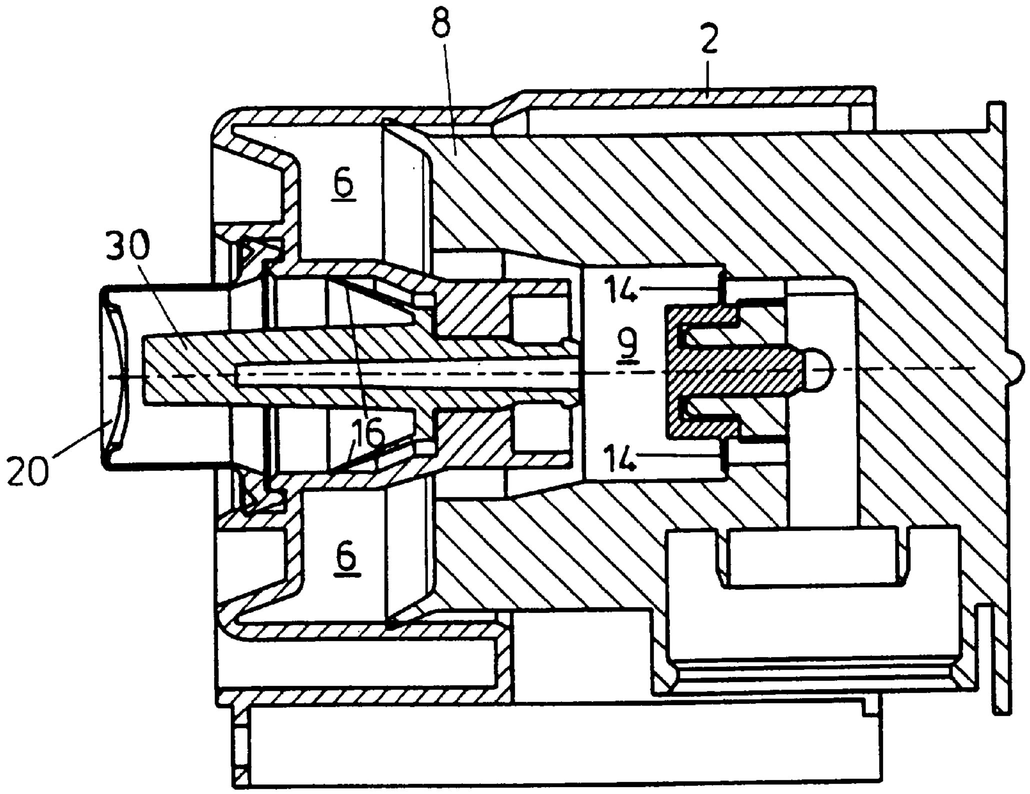
FIG. 7 is a cross section of the pump of FIG. 1, along line A—A in FIG. 2, where the plunger is moving back to its original position and liquid is being drawn in by the pump.
Figure 8:
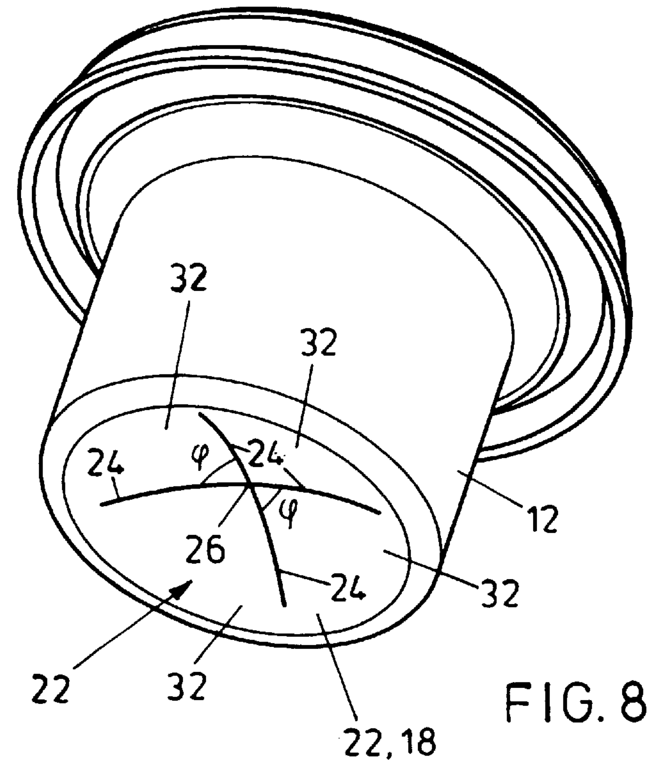
FIG. 8 shows the outlet nozzle of the pump according to FIGS. 1–7.

Then the plunger 8 is moved in the direction from the first to the second position. This situation is shown in FIG. 7. Two things occur here.

First, the second non-return valve 16 will close, so that no air can flow from the outlet nozzle 12 to the cylinder chamber 6. This creates a reduced pressure in the cylinder chamber 6, causing the cylinder chamber 6 to fill up with liquid from the liquid reservoir 38 via the inlet 10. In other words, liquid is pumped from the liquid reservoir 38. Eventually, the cylinder chamber 6 will be filled completely filled with liquid. The non-return valve 14 will open for the cylinder chamber 6 to be filled.

Thereupon, simultaneously with the plunger returning in the direction from the first position to the second position, the outlet valve energization element 30 will be moved in a direction opposite to the downstream direction. As a result, the valve subwalls 32 spring back into the rest position referred to earlier. The valve subwalls then close off the outflow opening again. The result is that the outlet nozzle 12, after the liquid has been dispensed as described hereinbefore, will not exhibit any after-drip.

Of course, the pump may further comprise a spring element which presses the plunger in the direction from the first to the second position, as is also discussed in Dutch patent application 1003894, further referred to hereinbelow.

In this example, the common point 26 is located at least substantially in the center of gravity of the valve wall. It is also conceivable, however, that the common point is located at a position different from the center of gravity.

Figure 9:
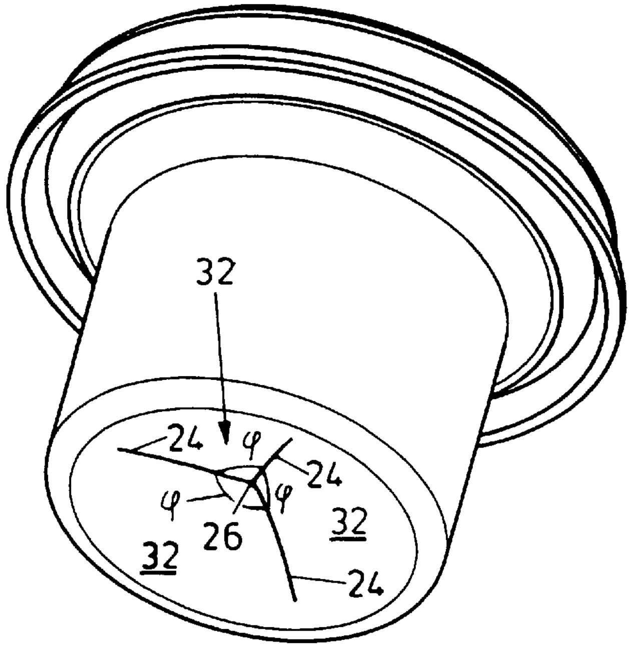
FIG. 9 shows a first alternative embodiment of the outlet nozzle of the pump of FIGS. 1–7.
Figure 10:
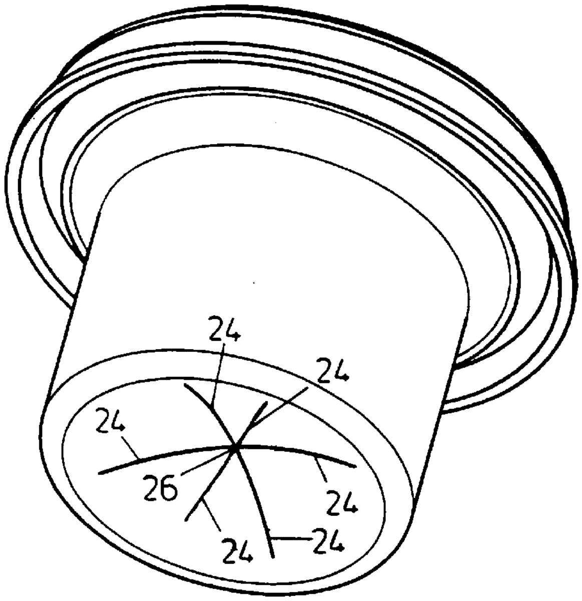
FIG. 10 shows a second alternative embodiment of the outlet nozzle of the pump according to FIGS. 1–7.
Figure 11:
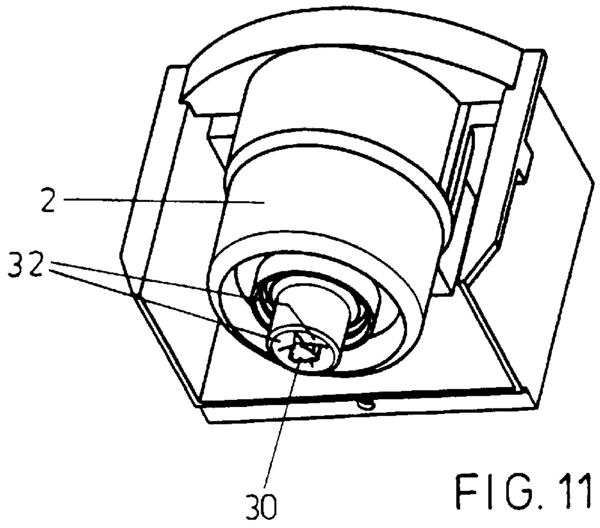
FIG. 11 is a front view of the pump device according to FIG. 1, with the pump in the position according to FIG. 6.

It is also possible that the valve wall is provided with, for instance, three, instead of four, cuts 24, as shown in FIG. 9. The angle ϕ here equals approximately 120°. Preferably, adjacent cuts mutually include an at least substantially equal angle. Of course, it is also possible for the valve wall 22 to comprise more than four cuts, such as for instance, six cuts, as shown in FIG. 10. The operation of the valve walls as shown in FIGS. 9 and 10, however, is entirely analogous to that of the valve wall of FIGS. 1–8.

Preferably, the valve wall as shown in FIGS. 1–8 is directed at least substantially perpendicularly to a flow direction 40 (see FIG. 5) at the outflow opening 20 of the liquid flow path extending through the outflow opening.

In this example, the outlet nozzle 12 is detachably connected with the remainder of the pump 1 and may therefore be easily removed, for instance to be cleaned.

The pump as described in the foregoing figures can be used advantageously in an extract manual dispenser as described in Dutch patent application 1003894. The pump of the present patent application then corresponds to the metering pump of patent application 1003894. The setting element of the extract manual dispenser described in that patent application can, accordingly, be advantageously used for determining a setting position located between the first and second position, while the plunger can be moved relative to the cylinder chamber from the second extreme position to the setting position. The setting position thus determines the amount of liquid to be dispensed once the pump is energized. The pump itself can also be provided with such a setting element. Such adaptations of the pump are all understood to fall within the scope of the invention.

I claim:

1. A pump for dispensing a liquid, comprising an inlet for pumping the liquid, an outlet nozzle and a liquid flow path extending from the inlet to the outlet nozzle for dispensing the pumped liquid via the outlet nozzle, characterized in that the outlet nozzle comprises an outflow opening which includes an outlet valve, the outlet valve being formed by a valve wall made of a flexible material, which, in a rest position, closes the outflow opening, the valve wall comprising at least three cuts provided in the configuration of a star, each extending from a common point of the valve wall in a radial direction of the outflow opening, and the pump further comprising an outlet valve energization element for pressing valve subwalls, formed between the cuts of the valve wall, from an inside of the outlet nozzle adjacent to the valve wall in a downstream direction of the outlet nozzle, so that said valve subwalls are bent in the downstream direction and at the cuts between the valve subwalls flow passages are formed for opening the outflow opening for dispensing the pumped liquid, while the valve subwalls spring back to the rest position and close the outflow opening again when the outlet valve energization element is moved back in a direction opposite to the downstream direction.

2. A pump according to claim 1, characterized in that the valve wall in the rest position has a round surface on the inside of the outlet nozzle adjacent to the valve wall.

3. A pump according to claim 1, characterized in that edges of the valve subwalls adjacent to the cuts are disposed against each other in the rest position.

4. A pump according to claim 1, characterized in that the common point is located at least substantially in the center of gravity of the valve wall.

5. A pump according to any one of the preceding claims, characterized in that the valve wall is directed at least substantially perpendicularly to a direction of flow at the outflow opening of the liquid flow path extending through the outflow opening.

6. A pump according to claim 1, characterized in that the pump further comprises means for moving the outlet valve energization element in downstream direction when the pump is energized for dispensing liquid.

7. A pump according to claim 1, characterized in that the valve wall is provided with four cuts.

8. A pump according to claim 1, characterized in that adjacent cuts of the cuts include an at least substantially equal angle.

9. A pump according to claim 1, characterized in that the pump is arranged as a metering pump for dispensing an amount of liquid in a metered manner upon an energization of the pump.

10. A pump according to claim 9, characterized in that the pump further comprises a cylinder chamber and a plunger which is accommodated in the cylinder chamber for movement between a first position and a second position, the plunger being connected to the outlet valve energization element, the liquid flow path of the pump extending from the inlet to the cylinder chamber and from the cylinder chamber to the outlet nozzle, while for dispensing the pumped liquid contained in the cylinder chamber in a metered manner, the plunger is moved in a direction from the second position to the first position; upon movement of the plunger in the direction from the second position to the first position, the outlet valve energization element causes the valve subwalls to bend from the rest position, so that the outflow opening is opened for dispensing the pumped liquid from the cylinder chamber; upon movement of the plunger in a direction from the first position to the second position, liquid is pumped via the inlet to the cylinder chamber; and upon movement of the plunger from the first position to the second position, the outlet valve energization element is moved back in the direction opposite to the downstream direction, so that the valve subwalls spring back into the rest position and close the outflow opening again.

11. A pump according to claim 10, characterized in that the inlet is in fluid communication with the cylinder chamber via a first non-return valve, the first non-return valve allowing liquid to pass only in the downstream direction of the liquid flow path.

12. A pump claim 10, characterized in that the cylinder chamber is in fluid communication with the outlet nozzle via a second non-return valve, the second non-return valve allowing liquid to pass only in the downstream direction of the liquid flow path.

13. An outlet nozzle for use in a pump claim 1.

14. A pump according to claim 2, characterized in that edges of the valve subwalls adjacent to the cuts are disposed against each other in the rest position.

15. A pump according to claim 11, characterized in that the cylinder chamber is in fluid communication with the outlet nozzle via a second non-return valve, the second non-return valve allowing liquid to pass only in the downstream direction of the liquid flow path.

* * * * *